(12) United States Patent
Laskowski et al.

(10) Patent No.: US 6,270,138 B1
(45) Date of Patent: Aug. 7, 2001

(54) REMOVABLE SHELVING ARRANGEMENT FOR VEHICLES

(75) Inventors: Leonard Laskowski, Lockport; Paul Bostjancic, Elwood, both of IL (US)

(73) Assignee: Ready Metal Manufacturing Company, Chicago, IL (US)

( * ) Notice: Subject to any disclaimer, the term of this patent is extended or adjusted under 35 U.S.C. 154(b) by 0 days.

(21) Appl. No.: 09/634,424

(22) Filed: Aug. 8, 2000

(51) Int. Cl.$^7$ ................. A47F 5/08; B60R 5/04; B60R 7/08
(52) U.S. Cl. ............ 296/24.1; 108/44; 108/110; 211/90.01; 224/546; 224/564
(58) Field of Search .................. 296/24.1; 224/402, 224/404, 543, 546, 564; 211/90.01, 90.02; 108/42, 44, 106, 107, 109, 110, 152

(56) References Cited

U.S. PATENT DOCUMENTS

| | | | | |
|---|---|---|---|---|
| 1,882,238 | * | 10/1932 | Brykczynski et al. | 296/24.1 |
| 2,340,374 | * | 2/1944 | George | 410/139 |
| 3,049,373 | * | 8/1962 | Biggers | 296/106 |
| 3,892,189 | * | 7/1975 | Killam | 108/109 |
| 3,984,118 | * | 10/1976 | Wilson | 410/121 |
| 4,247,144 | * | 1/1981 | Radek | 296/24.1 |
| 5,137,321 | * | 8/1992 | Landry et al. | 296/24.1 |
| 5,139,300 | * | 8/1992 | Carriere | 296/39.1 |
| 5,306,064 | * | 4/1994 | Padovano et al. | 296/24.1 |
| 5,848,711 | * | 12/1998 | Schmit | 211/90.04 |

* cited by examiner

Primary Examiner—Joseph D. Pape
Assistant Examiner—Paul Chenevert
(74) Attorney, Agent, or Firm—Orum & Roth

(57) ABSTRACT

A removable shelving component for vehicles uses permanently mounted vehicle internal side wall frames to removably attach shelving components with pin-into-hole and tongue-into-groove connection. Modularized, the shelving is customizable to suit any desired configuration.

5 Claims, 6 Drawing Sheets

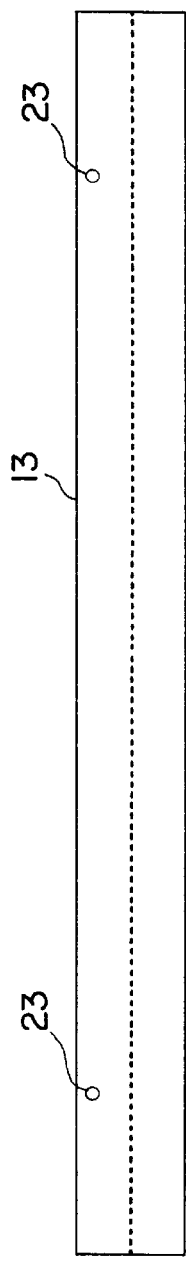
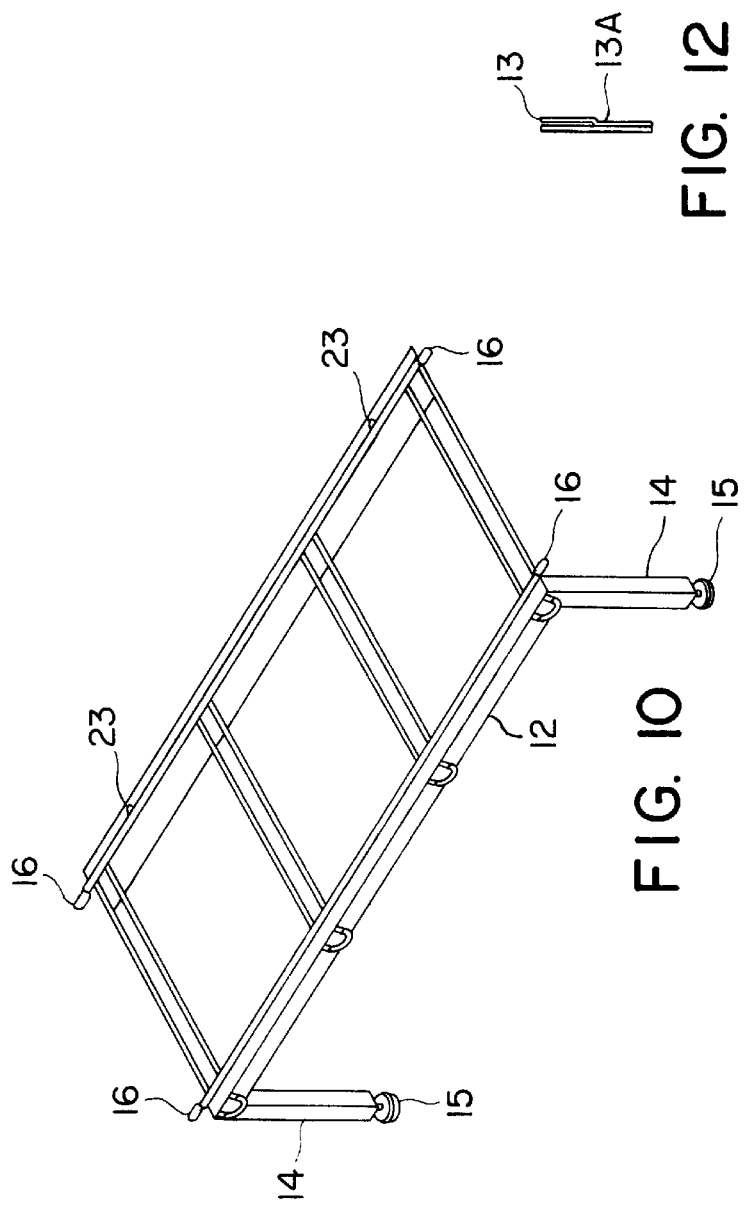
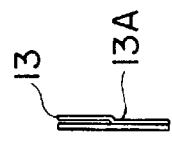

REMOVABLE SHELVING ARRANGEMENT FOR VEHICLES

BACKGROUND OF THE INVENTION

The invention relates to removable shelving, specifically removable shelving for commercial vehicles. Previous shelving is either permanent or difficult to remove. Shelving that attaches directly to the van walls damages the walls and/or their protective coatings.

SUMMARY OF THE INVENTION

A removable shelving arrangement for vehicles comprising permanent frame weldments which are attached to the vehicle internal side walls following the curve of the walls. Shelving assemblies mate to the frame weldments through pins into holes at the top and a tongue and groove maintained by retaining pins along the bottom length. The shelving may be configured with shelves, baskets, or any manner of custom configurations. Steel frame pieces are removable from the permanent frame as modules. They are built of steel with the different pieces welded together to form removable components.

BRIEF DESCRIPTION OF THE DRAWINGS

FIG. 10 is an isometric view of the street-side base frame weldment.

FIG. 11 is a schematic top view of the frame plate weldment.

FIG. 12 is a schematic end view of the frame plate weldment.

DETAILED DESCRIPTION OF THE INVENTION

The removable shelving arrangement for vehicles may be used in any vehicle. An embodiment specific to a 2000 FORD Econoline truck is described herein after.

Figure 1:
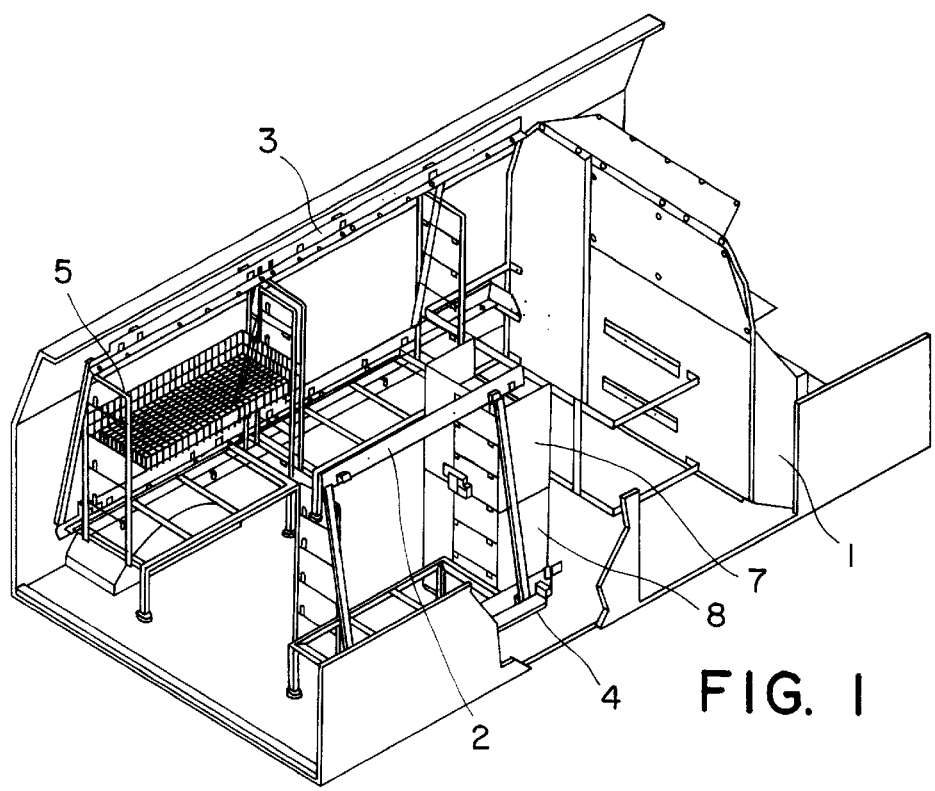
FIG. 1 is an isometric cut-away showing a removable shelving arrangement, as installed in a 2000 FORD Econoline truck.
Figure 2:
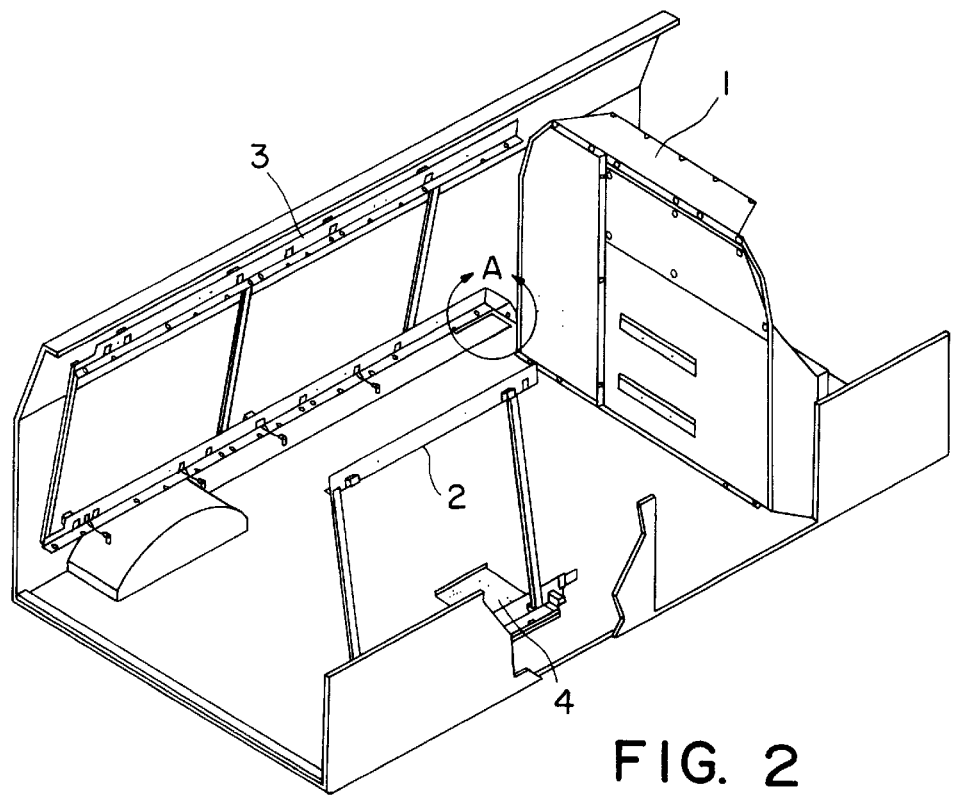
FIG. 2 is an isometric cut-away showing permanent frame weldments, and a floor mounting bracket as installed in a 2000 FORD Econoline truck.
Figure 3:
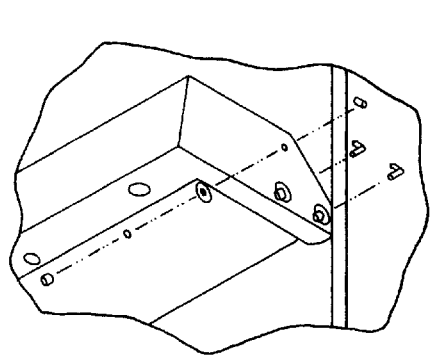
FIG. 3 is an isometric cut-away blow-up of area A from FIG. 2, showing connection of a street-side frame weldment to a bulkhead assembly.
Figure 4:
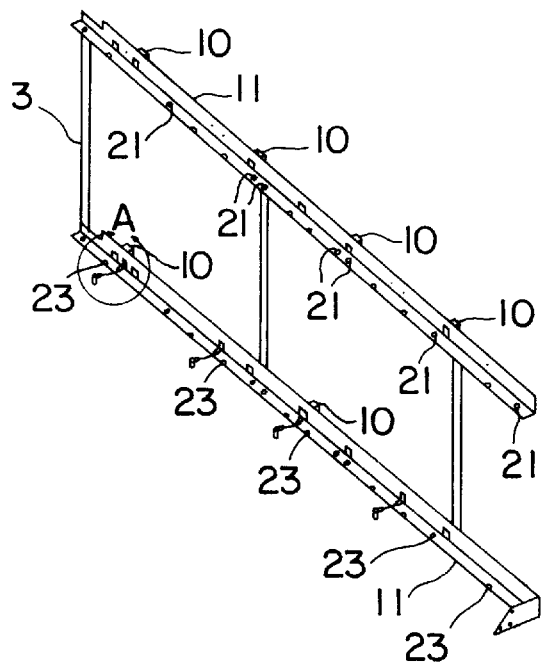
FIG. 4 is an isometric view of street side frame weldment.
Figure 6:
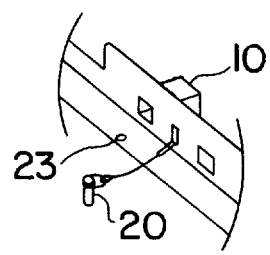
FIG. 6 is an schematic cut-away blow-up of area A from FIG. 4.
Figure 7:
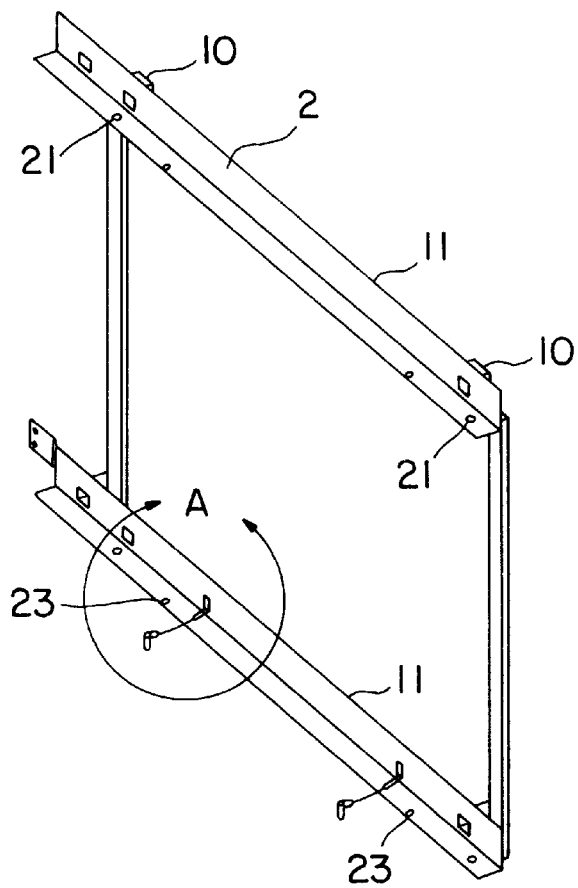
FIG. 7 is an isometric view of a curb-side frame weldment.

Referring to FIG. 1, an overview of the installed shelving is shown. The shelving is built onto each side wall of the vehicle, with allowances being made for side doors where applicable. In this embodiment, a bulkhead assembly 1 is used to separate the front of the vehicle from the cargo area. The street side frame weldment 3 shown in FIG. 4 is mounted to the street side wall of the vehicle with permanent anchors 10 screwed or spot welded to the vehicle wall. The lower front portion of the street side frame weldment 3 as shown in FIG. 3 mounts to the back of the bulkhead assembly 1. The curb side frame weldment 2 shown in FIG. 7 likewise mounts to the curb side vehicle wall. In this embodiment, the mounting and size of the curb side frame weldment takes into account a side door on the 2000 FORD Econoline truck. A floor mounting bracket 4 is affixed as shown in FIG. 2, to the floor of the curb side of the vehicle.

Figure 5:
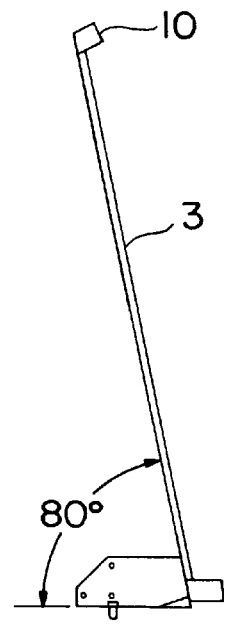
FIG. 5 is an isometric end view of a street-side frame weldment.
Figure 8:
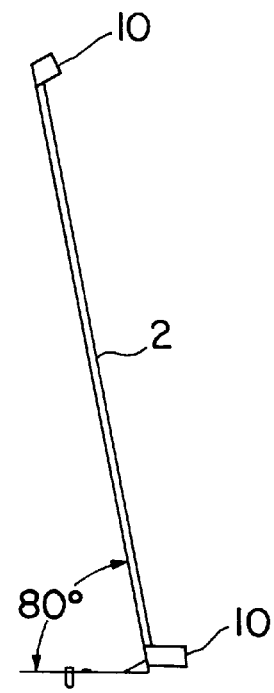
FIG. 8 is an schematic end view of a curb-side base frame connecting to a curb-side frame weldment.

Each of the frame weldments are mounted to the vehicle wall following the angle of the vehicle wall as shown in FIGS. 5 and 8.

Figure 9:
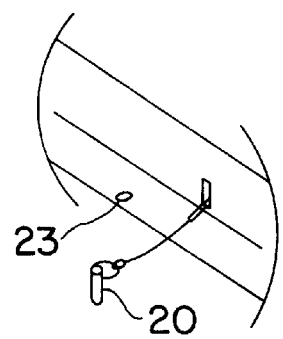
FIG. 9 is an isometric cut-away blow-up of area A of FIG. 7.
Figure 8A:
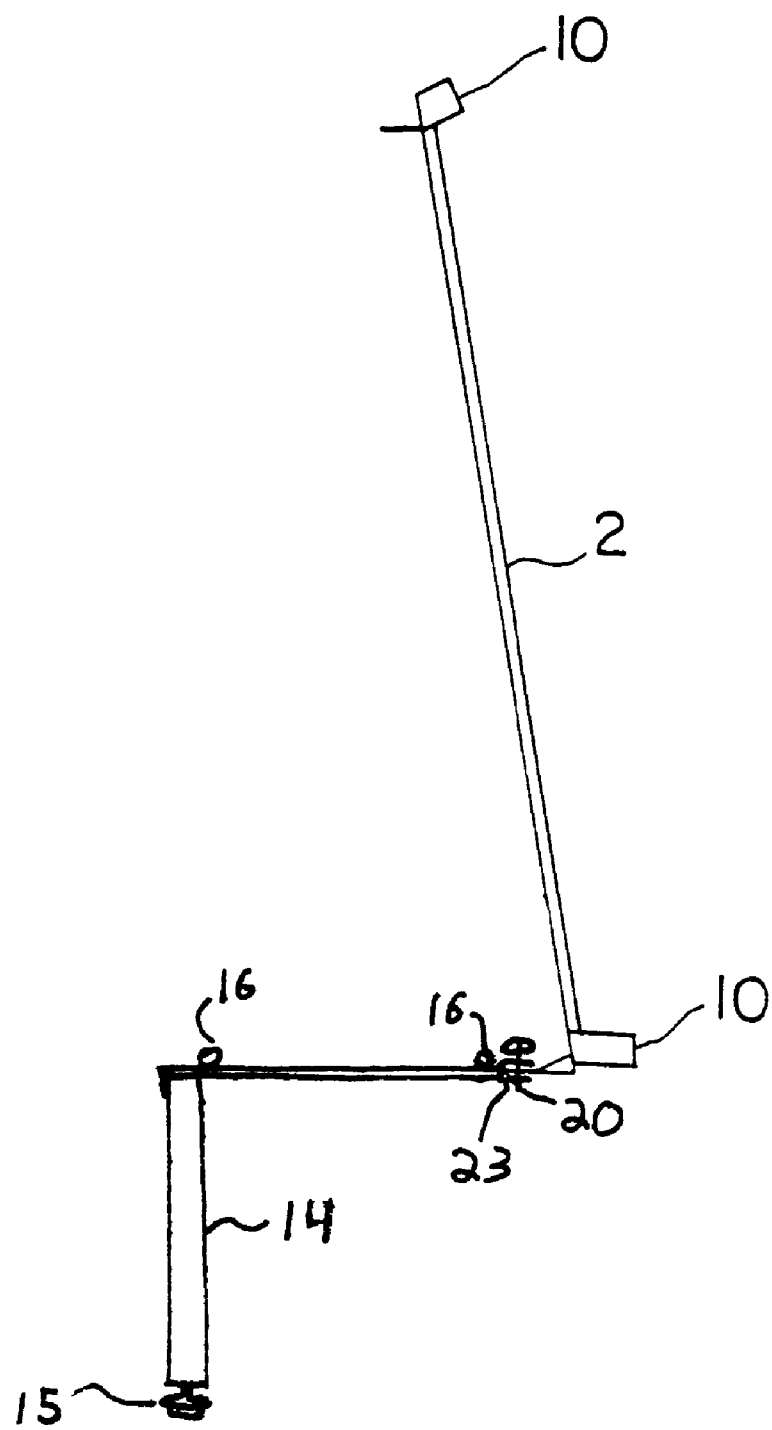
FIG. 8A is a schematic end view of a curb-side base frame connecting to a curb-side frame weldment.
Figure 13:
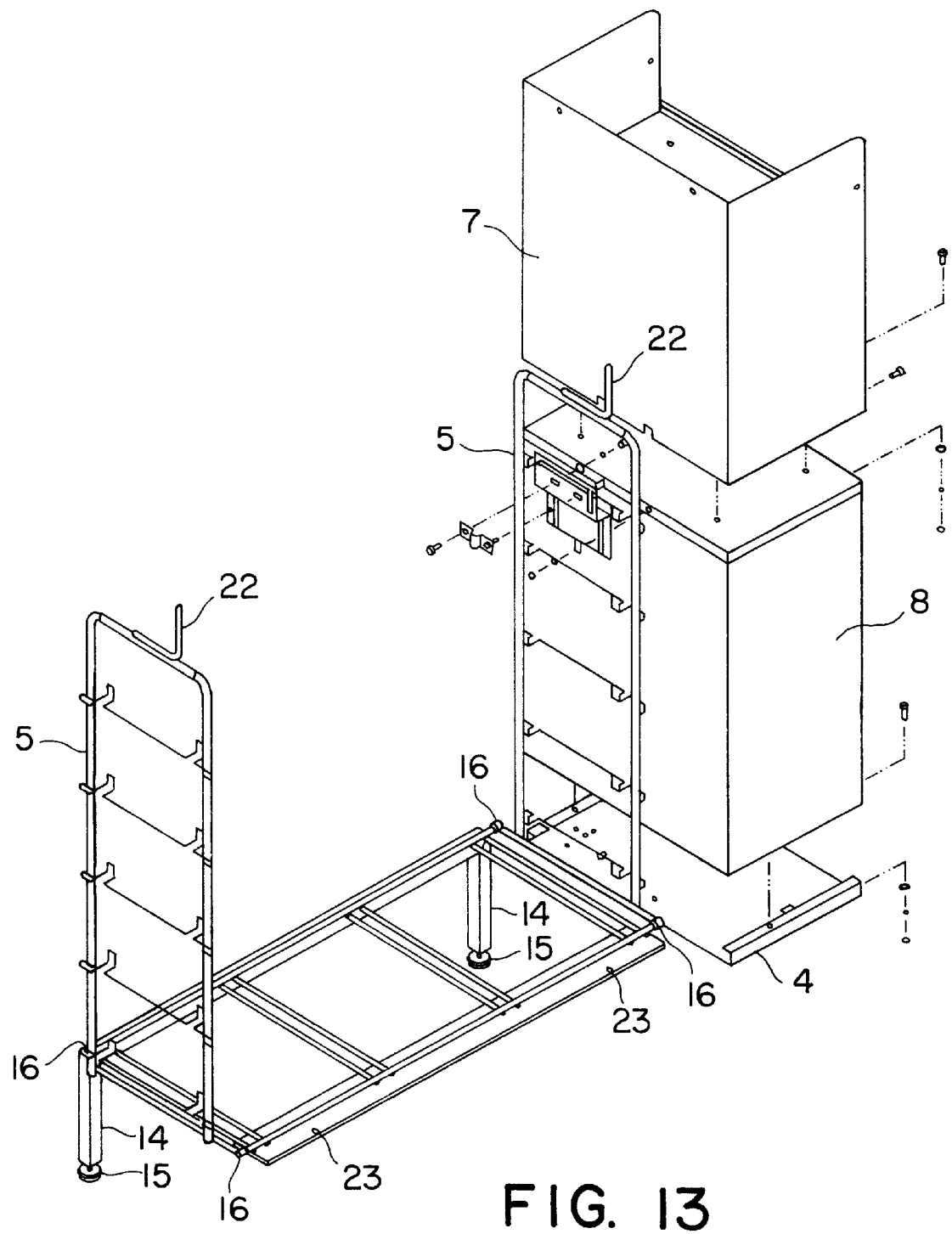
FIG. 13 is an isometric view of the curb-side base with basket/shelf support details.

The frame weldments have matching L-shaped top and bottom bars 11. The bottom L-shaped bar 11 is formed at an angle where the projecting part is parallel to the floor of the vehicle. The top L-shaped bar 11 has top holes 21 placed for the shelving assembly protrusion 22 to fit into. At the base, an L-shaped bar 11 provides a tongue which fits into a groove of a base frame 12. As shown in FIG. 9, pins 20 hang on chains which will removably connect the base frame groove to the tongue of the frame weldments through bottom holes 23. The base frame consists of a rack assembly, the back of which is a frame plate weldment 13A as shown in FIG. 11, this consisting of a top frame plate and a bottom frame plate welded together forming a groove 13 as shown in FIG. 12. The base frame has two legs 14 opposite the frame plate weldment 13A, each of the legs 14 supplied with a leveling foot 15. The base frame also has connections 16 at the side pieces for the vertical support elements 5 to be attached. On the street side, two shelf assemblies are used, and on the curb side, a single shelf assembly is used. The floor mounting bracket 4 is the base of a six-drawer cabinet 8 and bookshelf 7, shown in FIG. 13.

To install the removable shelving arrangement into the 2000 FORD Econoline truck as descried above, a base frame 12 with shelving assembly attached is brought to the van and pivoted so that the shelving assembly protrusions 22 at the top of the shelving unit mate with the holes 21 at the top of the street side frame weldments 3. As the shelving assembly protrusions 22 go through the mating holes 21, the assembly is then moved toward the side of the van so that the tongue of the base member of the permanent street side frame weldment 3 meets the groove 13 of the base frame weldment 13A, the tongue and groove mating together and pins 20 being placed through the retaining holes 23 to hold the base frame 12 in place. Similarly, on the curb side, a single base frame 12 with shelving unit attached is mounted. Upon the floor mounting bracket 4, the six-drawer cabinet 8 is affixed with nut and screw, and upon that the bookshelf 7 also with nut and screw.

An alternative embodiment to the pins on chains has the pins 20 affixed to the frame plate weldment with spring tabs so that they would be retainably snapped in and out of place. Also, configurations of more or less six-drawer cabinets or bookshelves and/or a possibility for removing the bulkhead assembly 1 allowing for even more room for the frame weldments towards the front of the van are possible. Within each shelving assembly can be baskets or solid shelves. The legs 14 of the base frame 12 are long enough to place the lowest shelf (the planar surface bounded by the base frame structure) above the height of the rear wheel well of the vehicle.

We claim:

1. A removable shelving arrangement for vehicles comprising:

a frame having top and bottom L-shaped rails with a projecting part having retaining holes and a frame mounting part, a base frame with a planar surface bounded by a front member, a back member, and side members, said back member having a rearward facing groove with retaining holes, said front member having at least one leg, a shelf structure with bottom connection and top projection, said frame is fixed to an interior wall of said vehicle, said base frame rearward facing groove is removably connected to said frame's bottom L-shaped rail's projecting part in a tongue and groove manner, held in place by a retaining pin passed through said retaining holes of said rearward facing groove and said bottom L-shaped rail, said shelf structure top projections are passed through said frame's top L-shaped rail projecting part retaining holes, and said shelf structure bottom connections are removably fixed to said side members.

2. The removable shelving arrangement for vehicles of claim 1, further comprising a leveler on each leg.

3. The removable shelving arrangement for vehicles of claim 1, wherein said frame is configured for attachment to a sloping vehicle wall, said L-shaped rails formed at an angle where said projecting part is parallel to the floor of the vehicle.

4. The removable shelving arrangement for vehicles of claim 1, wherein said frame is mounted on the vehicle wall above a wheel well within said vehicle, said leg being configured to reach from said front member to said floor of said vehicle.

5. The removable shelving arrangement for vehicles of claim 1, further including a floor mounting bracket fixed to the vehicle floor and a cabinet removably fixed to said floor bracket.

\* \* \* \* \*